United States Patent
Tsuji et al.

(10) Patent No.: US 7,724,345 B2
(45) Date of Patent: May 25, 2010

(54) COLOR FILTER SUBSTRATE AND LIQUID CRYSTAL DISPLAY PANEL EQUIPPED WITH SAME

(75) Inventors: Masayuki Tsuji, Mie (JP); Toshihide Tsubata, Mie (JP); Tsuyoshi Tokuda, Mie (JP)

(73) Assignee: Sharp Kabushiki Kaisha, Osaka (JP)

(*) Notice: Subject to any disclaimer, the term of this patent is extended or adjusted under 35 U.S.C. 154(b) by 433 days.

(21) Appl. No.: 11/573,013

(22) PCT Filed: Aug. 4, 2005

(86) PCT No.: PCT/JP2005/014319

§ 371 (c)(1),
(2), (4) Date: Jan. 31, 2007

(87) PCT Pub. No.: WO2006/013933

PCT Pub. Date: Feb. 9, 2006

(65) Prior Publication Data

US 2009/0009697 A1    Jan. 8, 2009

(30) Foreign Application Priority Data

Aug. 4, 2004    (JP)    ............... 2004-227723

(51) Int. Cl.
*G02F 1/1339*    (2006.01)
(52) U.S. Cl. ............ 349/157; 349/155
(58) Field of Classification Search ............ None
See application file for complete search history.

(56) References Cited

U.S. PATENT DOCUMENTS

| | | | |
|---|---|---|---|
| 6,067,144 A * | 5/2000 | Murouchi | 349/156 |
| 6,870,593 B2 | 3/2005 | Satoh | |
| 2001/0026347 A1 | 10/2001 | Sawasaki et al. | |
| 2001/0052959 A1 | 12/2001 | Tamatani et al. | |
| 2003/0048403 A1 | 3/2003 | Satoh | |
| 2003/0090609 A1 * | 5/2003 | Inoue et al. | 349/113 |
| 2003/0112405 A1 * | 6/2003 | Kim et al. | 349/156 |

(Continued)

FOREIGN PATENT DOCUMENTS

JP    63-179323 A    7/1988

(Continued)

OTHER PUBLICATIONS

Official communication issued in International Application No. PCT/JP2005/014319, mailed on Sep. 13, 2005.

(Continued)

*Primary Examiner*—Mike Stahl
(74) *Attorney, Agent, or Firm*—Keating & Bennett, LLP

(57) ABSTRACT

A color filter substrate according to the present invention includes a transparent substrate; at least three colors of colored layers provided on the transparent substrate; first columnar structure bodies 101 provided in pixel outskirts within a display region, the first columnar structure bodies 101 defining a cell gap; and second columnar structure bodies 102 provided in the pixel outskirts within the display region or outside the display region, the second columnar structure bodies 102 having a smaller height than that of the first columnar structure bodies 101, such that a difference from the height of the first columnar structure bodies 101 exceeds a range of elastic deformation of the first columnar structure bodies 101.

14 Claims, 11 Drawing Sheets

U.S. PATENT DOCUMENTS

| | | |
|---|---|---|
| 2004/0114087 A1 | 6/2004 | Cho et al. |
| 2005/0140914 A1* | 6/2005 | Sawasaki et al. ............ 349/155 |
| 2005/0151909 A1 | 7/2005 | Yagi et al. |

FOREIGN PATENT DOCUMENTS

| | | | |
|---|---|---|---|
| JP | 08-020627 B2 | | 3/1996 |
| JP | 11-174477 A | | 7/1999 |
| JP | 2001-066615 A | | 3/2001 |
| JP | 2001-147437 A | | 5/2001 |
| JP | 2001-201750 A | | 7/2001 |
| JP | 2001-290161 A | | 10/2001 |
| JP | 2002-107740 A | | 4/2002 |
| JP | 2003-084289 A | | 3/2003 |
| JP | 2003-121857 A | * | 4/2003 |
| JP | 2004-118200 A | | 4/2004 |
| JP | 2005-208583 A | | 8/2005 |

OTHER PUBLICATIONS

Official communication issued in the corresponding International Application No. PCT/JP2005/014319, mailed on Feb. 15, 2007.

* cited by examiner

COLOR FILTER SUBSTRATE AND LIQUID CRYSTAL DISPLAY PANEL EQUIPPED WITH SAME

BACKGROUND OF THE INVENTION

1. Field of the Invention

The present invention relates to a color filter substrate and a liquid crystal display panel including the same.

2. Description of the Related Art

Liquid crystal display devices are characterized by their small size, thinness, low power consumption, and light weight, and therefore are currently in wide use for various electronic devices. In particular, active matrix-type liquid crystal display devices having switching elements are widely adopted in OA devices such as personal computers, AV devices such as television sets, mobile phones, and the like. Moreover, the recent years have seen rapid improvements in display quality, e.g., increase in the size and increase in the definition of liquid crystal display devices, improvements in the pixel effective area ratio (higher aperture ratio), wider viewing angles, or improvements in color purity.

A liquid crystal display device generally includes: a liquid crystal display panel having a pair of opposing substrates (e.g., an active matrix substrate and a color filter substrate) and a liquid crystal layer interposed between the pair of substrates; and driving circuitry for supplying predetermined signals and voltages to the liquid crystal display panel. Furthermore, a liquid crystal display device of a transmission type or transflective type includes an illuminator such as a backlight. Note that part of the driving circuitry may be formed integrally with the liquid crystal display panel. Recently, liquid crystal television sets incorporating TV receivers are also rapidly gaining prevalence.

In a liquid crystal display panel, the thickness (which may also be referred to as a cell gap) of the liquid crystal layer is defined by a component called spacers. As the spacers, particulate spacers such as plastic beads and columnar structure bodies (which may also be referred to as "columnar spacers", "dot spacers", or "photospacers") which are formed on a substrate by using a photosensitive resin are employed. Although depending on the display mode, the thickness of a liquid crystal layer directly affects retardation, for example in a liquid crystal panel of the vertical alignment mode (VA mode), which is widely used in recent years. Therefore, in order to obtain a high display quality, it is important to set and maintain the thickness of the liquid crystal layer at a predetermined value. In a large-screen liquid crystal panel, it is necessary to set and maintain the thickness of the liquid crystal layer at a predetermined thickness over the entire display region, and thus optimization of the structure and location of the spacers constitutes an important technological problem.

On the other hand, as liquid crystal display panels increase in size, the "one drop filling technique" is adopted more and more frequently in the process of forming a liquid crystal layer in methods for producing a liquid crystal display panel (see, for example, Japanese Patent Publication No. 8-20627 (Patent Document 1)).

Conventionally, a method called the "(vacuum) injection technique" has widely been used. This method involves: retaining a liquid crystal cell (empty cell) within a vacuum chamber, the liquid crystal cell (empty cell) being obtained by attaching together a pair of substrates with a sealant so as to form a predetermined gap; after removing the air from within the liquid crystal cell, allowing the interior of the chamber to return to a normal atmospheric pressure while an injection inlet which is provided in a portion of a sealing section of the liquid crystal cell is in contact with a liquid crystal material; and after injecting the liquid crystal material into the liquid crystal cell by the action of atmospheric pressure, the injection inlet is sealed with resin. If such an injection technique is adopted in the manufacturing of a large-sized liquid crystal panel, injection of the liquid crystal material takes a long time, thus greatly reducing the production efficiency.

Therefore, the one drop filling technique, which can shorten the process time relative to the injection technique, is being adopted more and more.

In the one drop filling technique, as is described in Patent Document 1 above, a sealing section having a rectangular frame-like shape is formed by using a sealant on the surface of either one of a pair of substrates, and a liquid crystal material is dropped into the region surrounded by the sealing section. This is attached onto the other substrate, and the sealant is allowed to solidify (or typically "cured"), whereby a liquid crystal display panel having a liquid crystal layer is obtained. This one drop filling technique is a very important technology in the manufacturing of a large-sized liquid crystal display panel.

One of the problems of the one drop filling technique is that voids may occur in the liquid crystal layer. Various causes for voids are known. For example, Japanese Laid-Open Patent Publication No. 2002-107740 (Patent Document 2) discloses a remedy to reduce those voids which are ascribable to insufficiency in the supply of liquid crystal material. Japanese Laid-Open Patent Publication No. 11-174477 (Patent Document 3) discloses a method for reducing those voids which are ascribable to a gas which emanates from color filters and the like (including water adsorbed on the surface, e.g., color filters). Furthermore, Japanese Laid-Open Patent Publication No. 2003-84289 (Patent Document 4) discloses a remedy to reduce "low-temperature voids", which occur at a low temperature because of the spacers not being able to conform to the changing thickness of the liquid crystal layer, which in turn is ascribable to a thermal contraction of the liquid crystal material. In a liquid crystal display panel described in Patent Document 4, two types of columnar spacers of different heights are provided, and it is ensured that, within the range of elastic deformation of the taller columnar spacers, an external load will act also on the shorter columnar spacers. As a result, the taller spacers alone will absorb shrinkage of the cell gap due to a temperature change, thus reducing the occurrence of low-temperature voids.

However, through various studies of the inventors, it has been found that voids may occur due to causes which are not even described in the above Patent Documents.

In the one drop filling technique, when attaching the other substrate after dropping a liquid crystal material into the region surrounded by a sealing section on one of the substrates, the liquid crystal material will prevail over the entire liquid crystal cell as the liquid crystal material stretches (or spreads). If the liquid crystal material is difficult to stretch (or difficult to spread), there may be local insufficiencies of liquid crystal material, thus causing voids. Since these voids do not contain any gas, they may be referred specially to as "vacuum voids". Since vacuum voids are caused by the liquid crystal material's difficulty to stretch, they become more likely to occur as the spacer density (distribution density: the number of spacers per unit area) increases.

On the other hand, if the spacer density is too low, the distance between adjoining spacers becomes longer. Therefore, an external pressure to the liquid crystal cell, which is associated with the atmospheric pressure when opened to the atmosphere in the injection technique and in the one drop filling technique, will lead to an increased amount of deformation of the spacers and an increased amount of flexure of the glass substrates in between spacers. This leads to local narrowing of the cell gap, so that vacuum voids become more likely to occur. Moreover, the distance between adjoining spacers becomes longer with an increase in the size of the liquid crystal display panel (i.e., an increase in pixel size), thus making this problem more outstanding. Furthermore, in a frame region of the liquid crystal display panel (i.e., a peripheral region of the display region which lies inside the sealing section), there is a large distance between the particulate spacers mixed in the sealant and the spacers within the display region, so that the cell gap locally may become narrow due to flexure of the glass substrates, whereby vacuum voids may become more likely to occur.

Although problems of the one drop filling technique are illustrated above, when the injection technique is used, a decrease in throughput may occur due to the longer injection time of a liquid crystal material.

SUMMARY OF THE INVENTION

The present invention has been made in view of the above points, and a main objective of the present invention is to provide a color filter substrate having a structure which can suppress generation of vacuum voids in the one drop filling technique, and suppress an increase in the process time of the injection technique.

A color filter substrate according to the present invention is a color filter substrate for use in a liquid crystal display panel, comprising: a transparent substrate; at least three colors of colored layers provided on the transparent substrate; first columnar structure bodies provided in pixel outskirts within a display region, the first columnar structure bodies defining a cell gap; and second columnar structure bodies provided in the pixel outskirts within the display region or outside the display region, the second columnar structure bodies having a smaller height than that of the first columnar structure bodies, such that a difference from the height of the first columnar structure bodies exceeds a range of elastic deformation of the first columnar structure bodies.

In one embodiment, the color filter substrate has a black matrix in the pixel outskirts within the display region and/or in a frame region outside the display region, wherein the first and second columnar structure bodies are formed on the black matrix.

In one embodiment, the difference between the first columnar structure bodies and the second columnar structure bodies is 0.4 μm or more.

In one embodiment, the first columnar structure bodies include a plurality of resin layers, and the second columnar structure bodies lack at least one resin layer among the plurality of resin layers of the first columnar structure bodies.

In one embodiment, the first columnar structure bodies include a plurality of resin layers, and the first columnar structure bodies and the second columnar structure bodies have a common resin layer, the common resin layer having a same thickness.

In one embodiment, the plurality of resin layers include photosensitive resin layers. The photosensitive resin layers may be of a positive-type or a negative-type. Moreover, some of the plurality of resin layers may be of a positive-type while the others may be of a negative-type.

In one embodiment, the plurality of resin layers include at least two layers among the at least three colors of colored layers.

In one embodiment, the color filter substrate further has, in pixel regions, protrusion structure bodies for alignment control. The protrusion structure bodies for alignment control are, for example, ribs of an MVA-type liquid crystal display panel.

In one embodiment, the protrusion structure bodies for alignment control share a common layer with the second columnar structure bodies.

In one embodiment, in the display region, the second columnar structure bodies include a second columnar structure body which is disposed at a position substantially bisecting a distance between two adjacent first columnar structure bodies along a row direction or a column direction.

In one embodiment, the color filter substrate has a sealing section outside the display region, the second columnar structure bodies including a second columnar structure body which is disposed at a position substantially bisecting a shortest distance between a first columnar structure body or second columnar structure body which is disposed at an outermost end of the display region and the sealing section.

In one embodiment, the color filter substrate further comprises a vertical alignment film.

A liquid crystal display panel according to the present invention comprises any of the color filter substrates above. The liquid crystal display panel may be formed by a one drop filling technique, or formed by a vacuum injection technique.

A liquid crystal television set according to the present invention comprises the above liquid crystal display panel.

A color filter substrate according to the present invention includes first columnar structure bodies provided in pixel outskirts within a display region, the first columnar structure bodies defining a cell gap, and second columnar structure bodies having a smaller height than that of the first columnar structure bodies, such that a difference from the height of the first columnar structure bodies exceeds a range of elastic deformation of the first columnar structure bodies, the second columnar structure bodies being provided in the pixel outskirts within the display region or outside the display region. The first columnar structure bodies function as columnar spacers, whereas the second columnar structure bodies act to improve the stretchability (spreadability, flowability) of a liquid crystal material. As a result, according to the present invention, generation of vacuum voids in the one drop filling technique and increase in the process time in the injection technique can be suppressed.

DETAILED DESCRIPTION OF PREFERRED EMBODIMENTS

Figure 1:
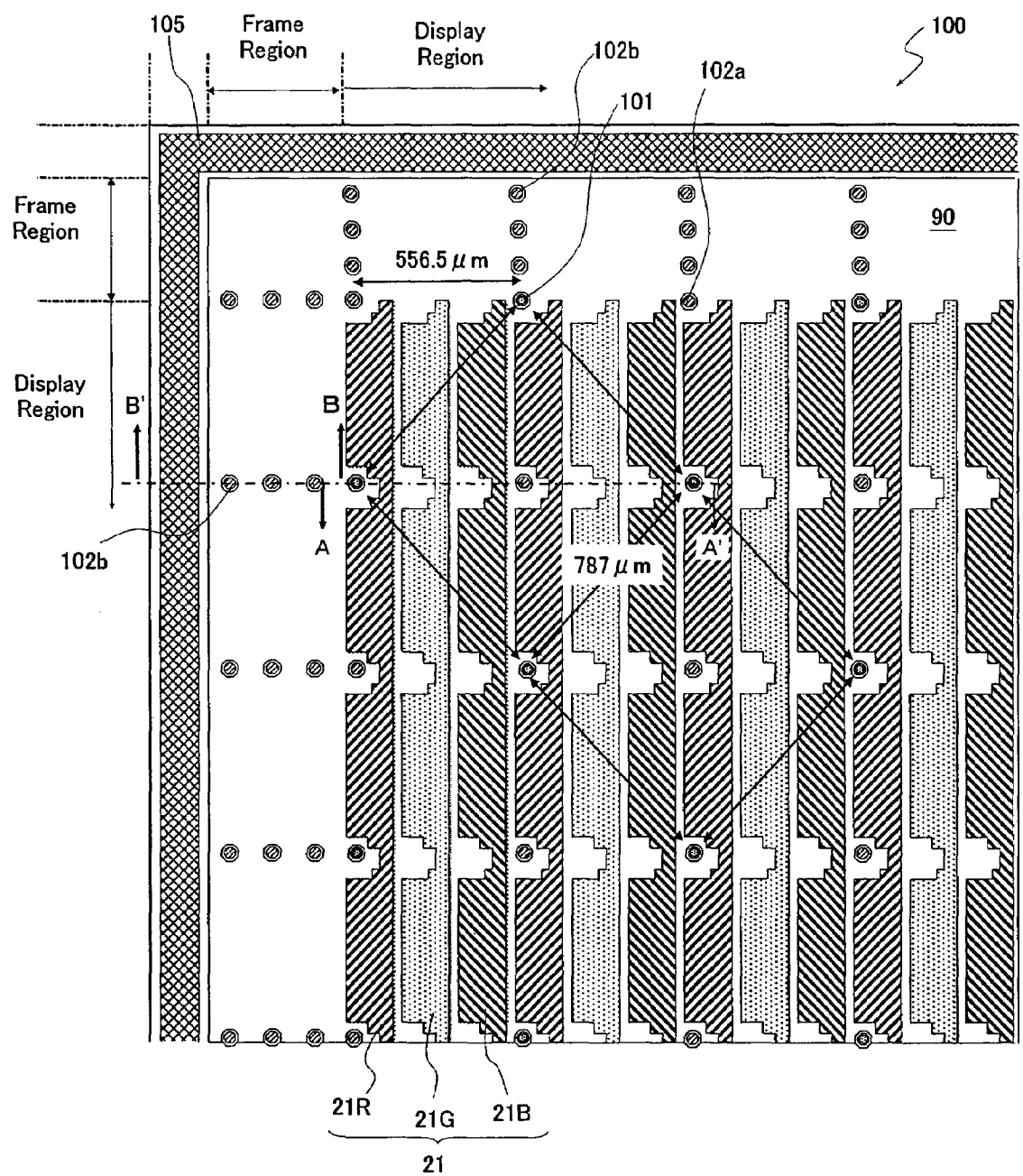
FIG. 1 is a schematic plan view of a liquid crystal display panel 100 according to an embodiment of the present invention.

The present invention is based on a new piece of knowledge which is obtained through vigorous studies by the inventors concerning stretchability of a liquid crystal material.

Conventionally, in order to ensure that a liquid crystal material is stretchable after the liquid crystal cell is opened to the atmosphere in the vacuum injection technique or the drop injection technique, it has been considered primarily important to maintain the cell gap. Therefore, in order to prevent the cell gap from becoming narrower due to deformation of the spacers or flexure of the glass substrates, methods have been adopted which increase the spacer density, or increase the elastic modulus of the spacers. However, increasing the spacer density actually leads to a greater likelihood of vacuum void generation, as described above.

Through various experiments, the inventors have found that providing columnar structure bodies which are shorter than columnar spacers (i.e., having a height for not functioning as spacers) leads to a phenomenon where vacuum void generation is suppressed although the cell gap becomes narrower when the liquid crystal cell is opened to the atmosphere. Although the reasons therefor are not necessarily clear, the inventors' view is presented below. Note that the present invention is not to be limited by this view.

When an alignment film is formed so as to cover a columnar structure body, the alignment film being formed on the upper face (and side faces) of the columnar structure body becomes thin. This is because a liquid alignment film material is being applied. This alignment film, which is thinner than in the other regions, has a weak orientation restriction force for the liquid crystal material, and therefore the liquid crystal material will stretch (flow) while the liquid crystal molecules do not take a stable orientation. Presumably, in the particular combination used in the experiment, i.e., a vertical alignment film and a liquid crystal material for vertical alignment, there is a high flow resistance when the liquid crystal molecules are oriented so as to be perpendicular to the direction in which the liquid crystal material stretches (a direction within the plane of the substrate), whereas the flow resistance decreases when the orientation of the liquid crystal molecules is disturbed above (or near) the columnar structure body, where the orientation restriction force is weak.

A color filter substrate according to an embodiment of the present invention includes: first columnar structure bodies defining a cell gap, which are provided in pixel outskirts within a display region; and second columnar structure bodies whose height is smaller than that of the first columnar structure bodies, such that the difference from the height of the first columnar structure bodies exceeds a range of elastic deformation of the first columnar structure bodies, the second columnar structure bodies being provided in the pixel outskirts within the display region or outside the display region. The first columnar structure bodies function as columnar spacers, whereas the second columnar structure bodies improve the stretchability (spreadability, flowability) of the liquid crystal material. Therefore, generation of vacuum voids in the one drop filling technique and increase in the process time in the injection technique can be suppressed.

Even if an external force is loaded to the liquid crystal cell when opened to the atmosphere in the one drop filling technique or the vacuum injection technique, such that the cell gap is narrowed, the second columnar structure bodies which are provided within the display region do not come in contact with the surface of a substrate (e.g., an active matrix substrate) which opposes a substrate (e.g., a color filter substrate) on which the second columnar structure bodies are provided, and a space is created thereon for allowing the liquid crystal material to flow therethrough. The second columnar structure bodies which are provided outside the display region (i.e., in the frame region) may come in contact with the opposing substrate depending on their distribution density, but they improve the stretchability of the liquid crystal material as do the second columnar structure bodies within the display region. In a preferred embodiment, each second columnar structure body is provided in a position where the cell gap between itself and a spacer (a first columnar structure body or a particulate spacer mixed in the sealant) defining the cell gap becomes narrowest, and improves the stretchability of the liquid crystal material in each such portion.

Applications to a vertical alignment-type liquid crystal display panel, where evident effects of the present invention will be obtained, will be illustrated below. However, the present invention is not limited thereto, and is also applicable to liquid crystal display panels utilizing horizontal alignment type liquid crystal layers, e.g., IPS or TN.

Hereinafter, with reference to the drawings, a color filter substrate according to an embodiment of the present invention and a liquid crystal display panel including the same will be described.

First, with reference to FIG. 1 and FIG. 2 to FIG. 5, the construction of the liquid crystal display panel inside the display region will be described.

FIG. 1 is a schematic plan view of a liquid crystal display panel 100 according to an embodiment of the present invention. Each of FIG. 2 to FIG. 5 is a schematic cross-sectional view taken along line A-A' in FIG. 1, and shows a variation of the construction of the first columnar structure bodies 101 and the second columnar structure bodies 102, where the planar arrangement is as shown in FIG. 1.

The liquid crystal display panel 100 includes a color filter substrate 20, an active matrix substrate 30, and a liquid crystal layer 40 which is provided between the color filter substrate 20 and the active matrix substrate 30. The liquid crystal layer 40 is provided within a region surrounded by a sealant 105, and is orientation-restricted by a vertical alignment film 104 so that it takes a vertical alignment state in the absence of an applied voltage. Note that a vertical alignment film and any other component element that may be formed on the surface of the active matrix substrate 30 facing the liquid crystal layer 40 are omitted for simplicity. The active matrix substrate 30 may be one of various known TFT substrates, for example.

The color filter substrate 20 includes a transparent substrate (e.g., a glass substrate) 10, a black matrix (also referred to as a BM film or a light shielding film) 90 formed thereupon, a color filter layer 21, first columnar structure bodies 101, second columnar structure bodies 102, a counter electrode (transparent electrode) 103, and an alignment film 104. The color filter layer 21 includes at least three colors of colored layers, with a red colored layer 21R, a green colored layer 21G, and a blue colored layer 21B being exemplified herein. The color filter layer 21 is typically formed of colored resin layers. The black matrix 90 may also be formed of a colored resin layer (i.e., a black resin layer), or formed of a metal layer or the like. The color filter substrate 30 includes a protrusion structure body 22 for alignment control in each pixel region, and the liquid crystal display panel 100 is an MVA-type liquid crystal display panel. It will be appreciated that the protrusion structure bodies 22 for alignment control may be omitted if they are not necessary.

Herein, a minimum unit that displays each color of red, green, or blue will be referred to as a pixel, and a minimum unit of color displaying, consisting of the three color pixels, will be referred to as a color-displaying pixel. A color-displaying pixel may include three or more colors of pixels.

The first columnar structure bodies 101 functioning as spacers are provided in pixel outskirts within the display region, and not provided in the frame region. This is because, as will be described later, it is preferable from the standpoint of display quality that the liquid crystal layer in the frame region has a smaller thickness than the thickness of the liquid crystal layer within the display region. The first columnar structure bodies 101 generally have a predetermined height in the range from about 2 μm to about 4 μm.

The second columnar structure bodies 102, whose height is lower than that of the first columnar structure bodies 101 and which do not function as spacers, include those 102a which are disposed within the display region and those 102b which are disposed outside the display region (i.e., in the frame region). Note that the effect of improving the fluidity of the liquid crystal material can also be provided by either one of them alone. The second columnar structure bodies 102 have a height which is smaller than the height of the first columnar structure bodies 101, such that the difference from the height of the first columnar structure bodies 101 exceeds the range of elastic deformation of the first columnar structure bodies 101. In the case where the height of the first columnar structure bodies 101 is about 2 μm, the range (limit) of elastic deformation is less than about 0.4 μm when a resin is used, generally speaking. In an example illustrated later, the elastic range of the height of the first columnar structure bodies 101 is about 0.2 μm to about 0.3 μm, whereas the difference from the height of the second columnar structure bodies 102 is set to 0.5 μm or more. Note that the "height" of the first columnar structure bodies 101 or the second columnar structure bodies 102 refers to a height above the BM film 90 in the case where both are formed on the BM film 90 as exemplified herein, or refers to a height above the glass substrate 10 in the case where the BM film is omitted (i.e., in the case of utilizing a light-shielding structure on the active matrix substrate side).

The first columnar structure bodies 101 and the second columnar structure bodies 102a within the display region are placed in such locations that, as shown in FIG. 1, the first columnar structure bodies 101 and the second columnar structure bodies 102 are alternately placed in a hound's-tooth check pattern. In other words, each second columnar structure body 102 is disposed in a position substantially bisecting the distance between two adjacent first columnar structure bodies 101 along a row direction or a column direction (as defined by the matrix arrangement of pixels) because the cell gap becomes smallest at such a position. Note that the locations of the first columnar structure bodies 101 and the second columnar structure bodies 102 are not limited thereto.

The active matrix substrate 30 can be produced as follows, for example.

In order to form scanning signal lines (gate lines) (not shown) and storage capacitor lines (not shown), a film of metal such as a Ti/Al/Ti multilayer film is formed on a transparent substrate by sputtering; a resist pattern is formed by a photolithography technique; dry etching is performed by using an etching gas such as a chlorine-type gas; and the resist is removed to form them simultaneously. Thereafter, a gate insulating film composed of silicon nitride (SiNx) or the like, an active semiconductor layer composed of amorphous silicon or the like, and a low-resistance semiconductor layer composed of amorphous silicon which is doped with phosphorus or the like are formed by CVD. Thereafter, in order to form data signal lines (source lines) (not shown), drain lead lines (not shown), electrodes for creating storage capacitors (not shown), a film of metal such as Al/Ti is formed by sputtering; a resist pattern is formed by a photolithography technique; a dry etching is performed by using an etching gas such as a chlorine-type gas; and the resist is removed to form them simultaneously. Note that each storage capacitor is formed via a gate insulating film of about 400 nm between a storage capacitor line (not shown) and an electrode (not shown) for creating a storage capacitor. Thereafter, for source/drain separation, the low-resistance semiconductor layer is dry-etched by using a chlorine gas or the like, and thus TFT devices (not shown) are formed. Next, an interlayer insulating film (not shown) composed of a photosensitive acrylic resin or the like is applied by spin-coating, and contact holes (not shown) for achieving electrical contact between drain lead lines (not shown) and pixel electrodes are formed by a photolithography technique. The interlayer insulating film (not shown) is about 3 μm. Furthermore, in order to form pixel electrodes (not shown), a film of ITO is formed by sputtering; a resist pattern is formed by a photolithography technique; and etching is performed by using an etchant such as ferric chloride, thus obtaining a pixel electrode pattern. Thus, the active matrix substrate 30 is obtained.

The color filter substrate 20 can be produced as follows, for example.

A negative-type photosensitive acrylic resin solution having carbon microparticles dispersed therein is applied onto the transparent substrate 10 by spin-coating, followed by drying, and thus a black photosensitive resin layer is formed. Next, a black photosensitive resin layer is subjected to exposure via a photomask, followed by development, and thus the black matrix layer (BM) 90 is formed. At this time, in the regions where a first colored layer (e.g., a red colored layer), a second colored layer (e.g., a green colored layer), and a third colored layer (e.g., a blue colored layer) are formed, apertures for the first colored layer, apertures for the second colored layer, and apertures for the third colored layer are formed (each aperture corresponding to each pixel electrode). Next, a negative-type photosensitive acrylic resin solution having a pigment dispersed therein is applied by spin-coating, followed by drying, and an exposure and development is performed by using a photomask, and thus the red colored layer is formed.

Thereafter, the second colored layer (e.g., a green colored layer) and the third colored layer (e.g., a blue colored layer) are similarly formed, whereby the color filter layer 21 is accomplished.

Hereinafter, with reference to the cross-sectional views of FIG. 2 to FIG. 5, the structures and locations of the first columnar structure bodies 101 and the second columnar structure bodies 102 will be described.

Figure 2:
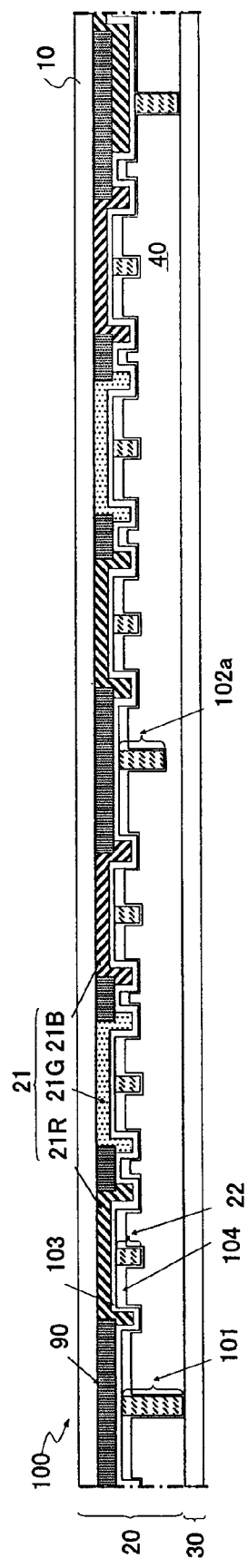
FIG. 2 is a cross-sectional view taken along line A-A' in FIG. 1, which is a schematic view showing an exemplary cross-sectional structure within a display region of the liquid crystal display panel 100.

First, FIG. 2 is referred to.

After the color filter layer 21 is formed, the counter electrode 103, composed of ITO or the like, is formed by sputtering.

Then, a negative-type photosensitive acrylic resin is applied by spin-coating, followed by drying, and a exposure and development is performed by using a photomask, thus forming the first columnar structure bodies 101 defining the cell gap in the display region.

Thereafter, a thin application film is applied by a similar method to form the second columnar structure bodies 102, whose height is lower than that of the first columnar structure bodies 101 and which do not contribute to the creation of the cell gap.

Each second columnar structure body 102 is disposed in a position where the cell gap becomes narrowest due to deformation of the first columnar structure bodies 101 and flexure of the glass substrates caused by an external pressure when opened to the atmosphere after evacuation in the injection technique or the one drop filling technique.

Figure 10:
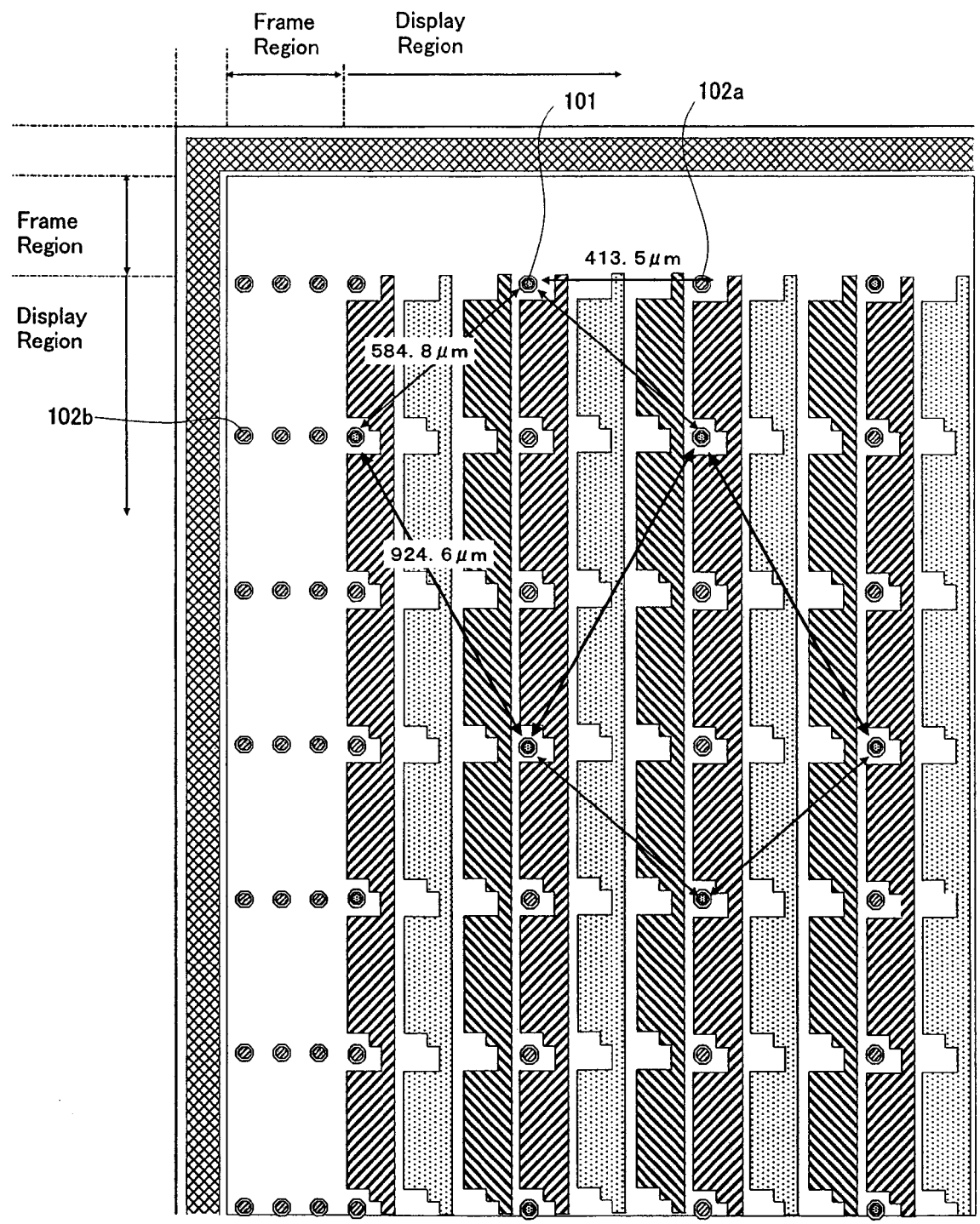
FIG. 10 is a schematic plan view of another liquid crystal display panel according to an embodiment of the present invention.

As for specific locations of the first columnar structure bodies 101, when their column size (diameter) is φ18 μm, regular spacer locations are adopted such that the first columnar structure bodies 101 are placed at a constant pitch (e.g., 787 μm), as shown in FIG. 1. As for the second columnar structure bodies 102, relative to the first columnar structure bodies 101, the second columnar structure bodies 102 are disposed in each point where the cell gap becomes narrowest due to deformation of the first columnar structure bodies 101 and flexure of the glass substrates. Specifically, as shown in FIG. 1, each of them is disposed in the center of a tetragon whose apices are at the first columnar structure bodies 101. Note that, in the case where the first columnar structure bodies 101 are not in regular locations, as shown in FIG. 10, greatest effects will be obtained by disposing them at positions where the cell gap becomes narrowest due to deformation of the first columnar structure bodies 101 and flexure of the glass substrates. However, since disturbance in orientation and lowering of the aperture ratio are predictable, they are preferably disposed above the black matrix (pixel outskirts) near the regions where the cell gap becomes narrowest.

Then, a positive-type phenol-novolac type photosensitive resin solution is applied, followed by drying, and an exposure and development is performed by using a photomask, thus forming the protrusions for vertical alignment controls 22. A positive-type material may also be used for the first columnar structure bodies 101 and the second columnar structure bodies 102, whereas a negative-type material may also be used for the protrusion structure bodies 22 for alignment control. Moreover, the same material may be used for all of them, and simultaneous formation can be achieved by varying the height of the second columnar structure bodies 102 and varying the amount of exposure of the protrusion structure bodies 22 for alignment control, relative to the first columnar structure bodies 101.

In the present embodiment, the BM film thickness is 1.6 μm; the film thickness of each of the first to third colored layers is 1.8 μm; colored layers 21' in an underlying portion of each first columnar structure body 101 each have a film thickness of 1.7 μm; the first columnar structure bodies 101 have a height of 2.3 μm; the second columnar structure bodies 102 have a height of 1.8 μm; and the protrusion structure bodies 22 for alignment control have a height of 1.7 μm. In this case, there is a difference of 0.5 μm between the height of the first columnar structure bodies 101 and the height of the second columnar structure bodies 102.

Moreover, in the present embodiment, the first columnar structure bodies 101, the second columnar structure bodies 102, and the protrusion structure bodies 22 for alignment control may be simultaneous formed through one round of a film formation, exposure, and development process, by varying the amount of exposure or amount of exposure based on the mask aperture size.

Figure 3:
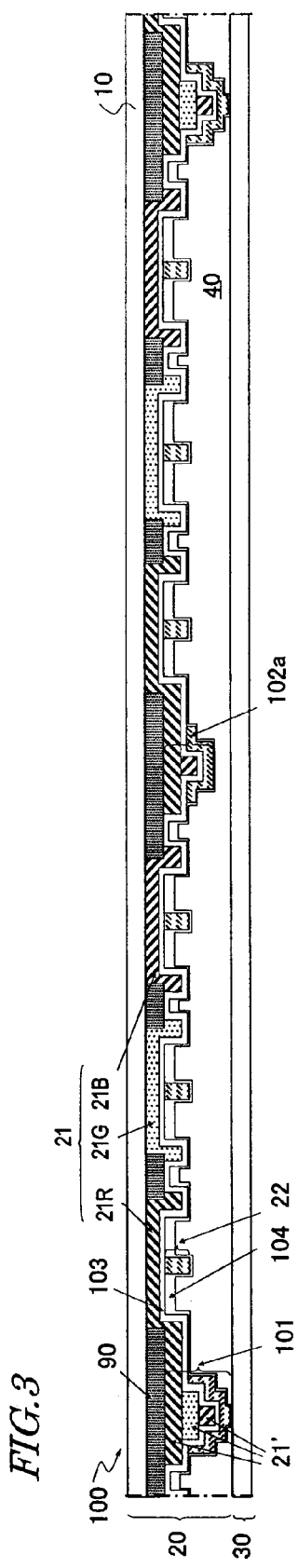
FIG. 3 is a cross-sectional view taken along line A-A' in FIG. 1, which is a schematic view showing another exemplary cross-sectional structure within the display region of the liquid crystal display panel 100.

Next, FIG. 3 is referred to.

As in the liquid crystal display panel of an embodiment shown in FIG. 3, when forming the first columnar structure bodies 101 and the second columnar structure bodies 102, among the first columnar structure bodies 101, second columnar structure bodies 102 and protrusions for alignment control 22 which are to be formed of a negative-type resist or a positive-type resist, it may be possible to dispose stacked layers of three colors (e.g., a red colored layer, a green colored layer, and a blue colored layer) in an underlying portion of each first columnar structure body 101, and dispose two colored layers (e.g., a green colored layer and a blue colored layer) in an underlying portion of each second columnar structure body 102, thus simultaneously forming the protrusion structure bodies 22 for alignment control and the first columnar structure bodies 101 and the second columnar structure bodies 102 of different heights.

In the present embodiment, the BM film thickness is 1.6 μm; the first to third colored layers each have a film thickness of 1.8 μm; the colored layers 21' in the underlying portion of each first columnar structure body 101 respectively have film thicknesses of 1.7 μm, 1.1 μm, and 0.75 μm; and the spacer-forming material have a film thickness of 0.45 μm. The colored layers 21' in the underlying portion of each second columnar structure body 102 have film thicknesses of 1.7 μm and 1.1 μm; and the spacer-forming material has a film thickness of 0.7 μm. The protrusion structure bodies 22 for alignment control have that of 1.7 μm. In this case, there is a difference of 0.5 μm between the height of the first columnar structure bodies 101 and the height of the second columnar structure bodies 102.

Alternatively, in the present embodiment, it would also be possible to adopt: a structure including two layers in the underlying portion of each first columnar structure body 101 and one layer under each second columnar structure body 102; or a structure including one layer in the underlying portion of each first columnar structure body 101 and no stacked layers in the underlying portion of each second columnar structure body 102, thereby forming the second columnar structure bodies 102 whose height is lower than that of the first columnar structure bodies 101.

Thus, by constructing each first columnar structure body 101 from a plurality of resin layers, and by omitting at least one resin layer among the plurality of resin layers composing each first columnar structure body 101, the second columnar structure bodies 102 having a difference in height between the first columnar structure bodies 101 can be obtained through a simple process. By adopting a construction in which the first columnar structure bodies 101 and the second columnar structure bodies 102 include a common resin layer(s), such that the common resin layer(s) have the same thickness, the process can be further simplified. For example, the method described in Patent Document 4 mentioned above varies the thicknesses of colored layers in order to ensure that a difference in height between two columnar spacers falls within a predetermined range (i.e., within the range of elastic deformation of the taller spacer); however, this entails a complicated production process, and it is difficult to control height. Furthermore, varying the thicknesses of colored layers may result in coloration during display. Using a colored layer(s) of the same thickness can prevent such problems.

Moreover, according to a study of the inventors, when adopting a construction such as the above where colored layers composing the color filter layer are stacked, it is necessary to ensure that each individual first columnar structure body 101 has a relatively large size (i.e., cross-sectional area parallel to the substrate plane), and it is necessary to reduce the number of spacers (first columnar structure bodies) in order to obtain a moderate panel elasticity. Furthermore, when using a negative-type photosensitive resin, the columnar structure bodies themselves generally have a high elastic modulus, which makes it necessary to decrease them in number. Although the glass substrates may have large amounts of flexure in such cases, disposing the second columnar structure bodies according to the present invention will improve the stretchability of the liquid crystal material, and suppress vacuum void generation. Therefore, the present invention is particularly advantageous in a construction where the first columnar structure bodies 101 are formed by stacking colored layers.

Figure 4:
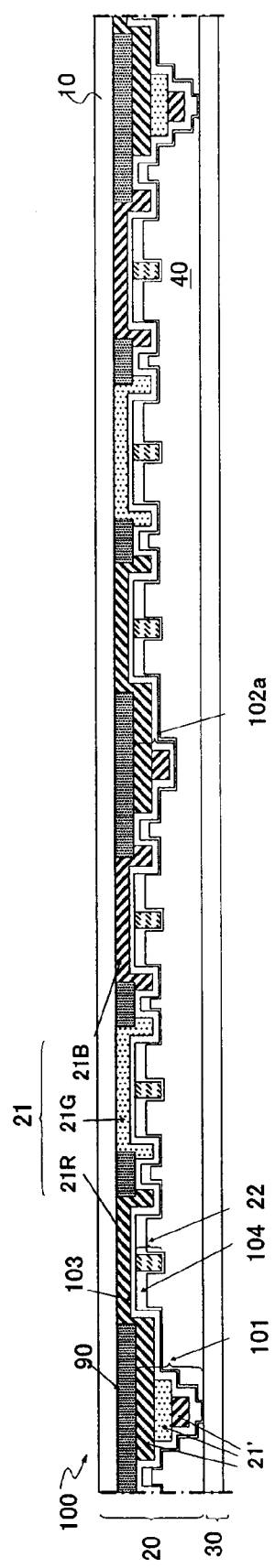
FIG. 4 is a cross-sectional view taken along line A-A' in FIG. 1, which is a schematic view showing still another exemplary cross-sectional structure within the display region of the liquid crystal display panel 100.

Next, FIG. 4 is referred to.

As in the liquid crystal display panel of an embodiment shown in FIG. 4, it may be possible to form each first columnar structure body 101 from stacked colored layers of three colors (e.g., a red colored layer, a green colored layer, and a blue colored layer), and each second columnar structure body 102 from only two colored layers (e.g., a green colored layer and a blue colored layer), and separately form the protrusion structure bodies 22 for alignment control alone.

In the present embodiment, the BM film thickness is 1.6 µm; the first to third colored layers each have a film thickness of 1.7 µm; and the colored layers 21' in the underlying portion of each first columnar structure body 101 respectively have film thicknesses of 1.7 µm, 1.1 µm, and 0.75 µm. The colored layers 21' in the underlying portion of each second columnar structure body 102 have film thicknesses of 1.7 µm and 1.1 µm. The protrusion structure bodies 22 for alignment control have that of 1.7 µm. In this case, there is a difference of 0.75 µm between the height of the first columnar structure bodies 101 and the height of the second columnar structure bodies 102.

Alternatively, in the present embodiment, it would also be possible to adopt a structure in which each first columnar structure body 101 has stacked colored layers of two colors and each second columnar structure body 102 has that of one color, thereby forming the second columnar structure bodies 102 whose height is lower than that of the first columnar structure bodies 101.

Figure 5:
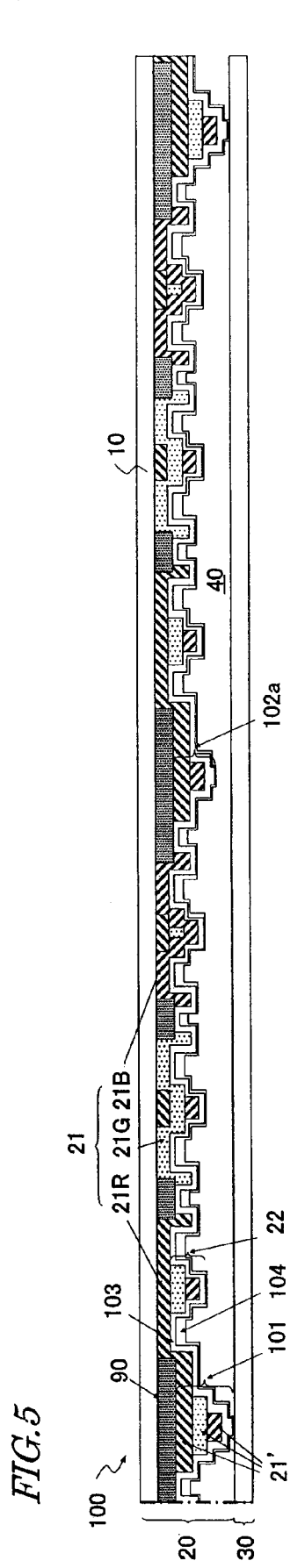
FIG. 5 is a cross-sectional view taken along line A-A' in FIG. 1, which is a schematic view showing still another exemplary cross-sectional structure within the display region of the liquid crystal display panel 100.
Figure 6:
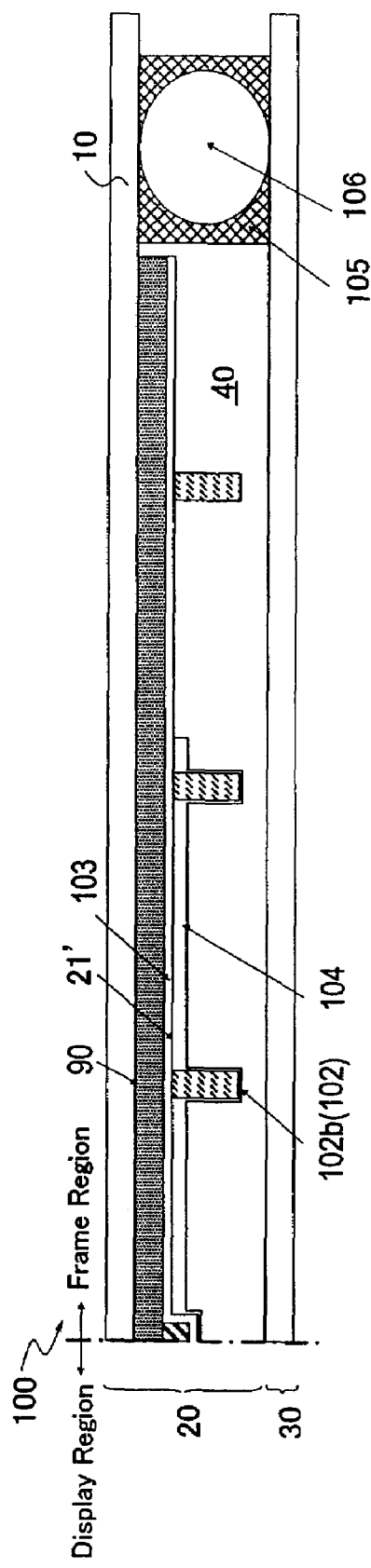
FIG. 6 is a cross-sectional view taken along line B-B' in FIG. 1, which is a schematic view showing an exemplary cross-sectional structure outside the display region of the liquid crystal display panel 100.
Figure 7:
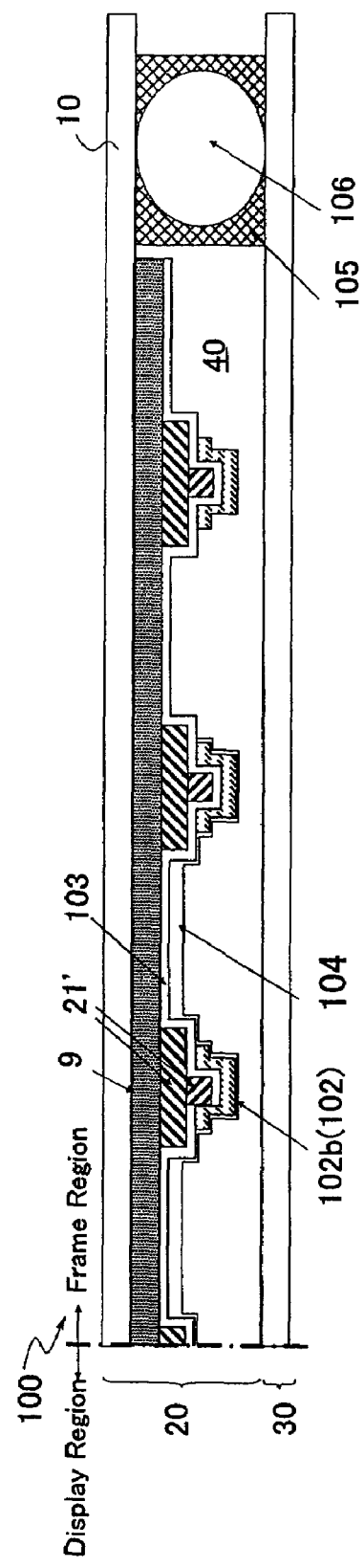
FIG. 7 is a cross-sectional view taken along line B-B' in FIG. 1, which is a schematic view showing another exemplary cross-sectional structure outside the display region of the liquid crystal display panel 100.
Figure 8:
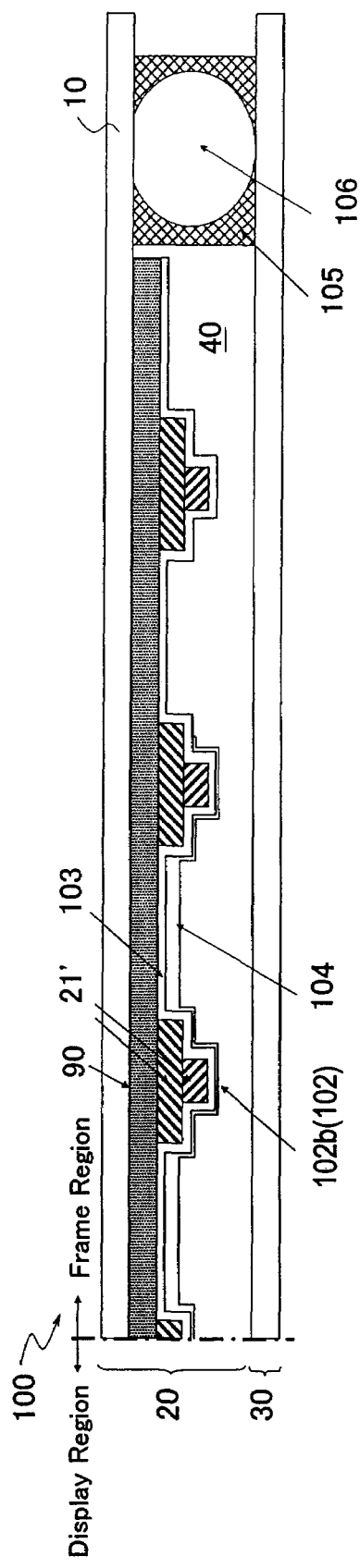
FIG. 8 is a cross-sectional view taken along line B-B' in FIG. 1, which is a schematic view showing still another exemplary cross-sectional structure outside the display region of the liquid crystal display panel 100.
Figure 9:
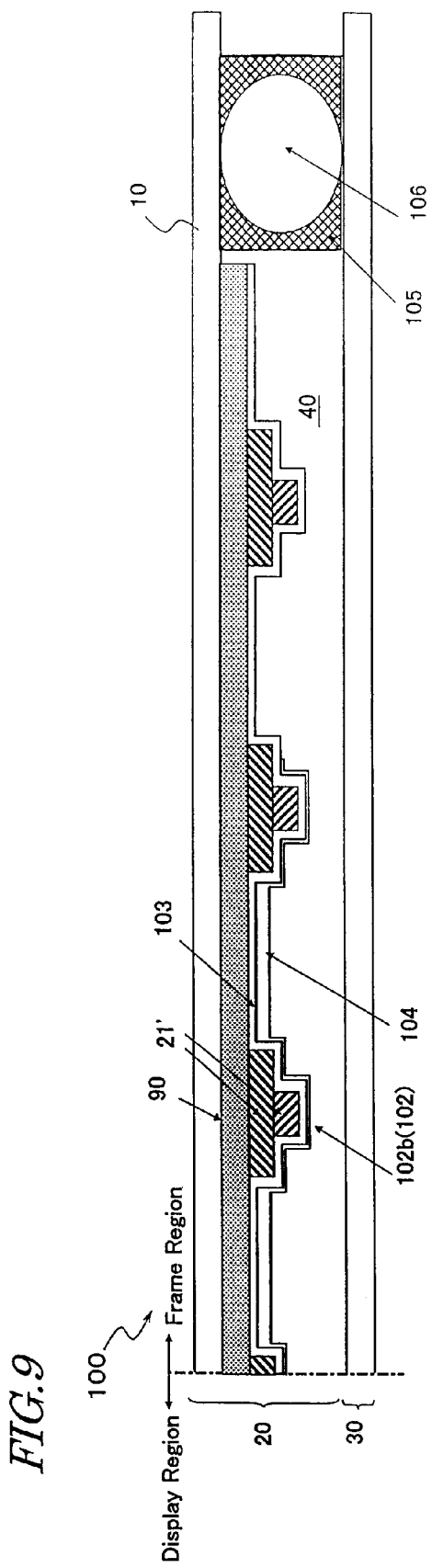
FIG. 9 is a cross-sectional view taken along line B-B' in FIG. 1, which is a schematic view showing still another exemplary cross-sectional structure outside the display region of the liquid crystal display panel 100.

Next, FIG. 5 is referred to.

As in the liquid crystal display panel of an embodiment shown in FIG. 5, it may also be possible to form each first columnar structure body 101 from stacked colored layers of three colors (e.g., a red colored layer, a green colored layer, and a blue colored layer) and each second columnar structure body 102 from only two colored layers (e.g., a green colored layer and a blue colored layer) 21', and also form each protrusion structure body 22 for alignment control from a multilayer structure of three colors of colored layers.

In the present embodiment, the BM film thickness is 1.6 µm; the first to third colored layers each have a film thickness of 1.7 µm; the colored layers 21' in the underlying portion of each first columnar structure body 101 respectively have film thicknesses of 1.7 µm, 1.1 µm, and 0.75 µm. The colored layers 21' in the underlying portion of each second columnar structure body 102 have film thicknesses of 1.7 µm and 1.1 µm. The protrusion structure bodies 22 for alignment control have that of 1.7 µm. In this case, there is a difference of 0.75 µm between the height of the first columnar structure bodies 101 and the height of the second columnar structure bodies 102.

Alternatively, in the present embodiment, it would also be possible to adopt a structure in which each first columnar structure body 101 has stacked colored layers of two colors and each second columnar structure body 102 has that of one layer, thereby forming the second columnar structure bodies 102 whose height is lower than that of the first columnar structure bodies 101.

Although the above embodiments each illustrate a BM which is composed of a resin, a BM which is composed of a metal can also be embodied. Although examples have been illustrated where the colored layers are formed by a spin coating technique, a die-coating technique or a dry film lamination technique may also be performed.

In the above embodiments, the height differences between the first columnar structure bodies 101 and the second columnar structure bodies 102 are 0.5 µm, 0.5 µm, 0.75 µm, and 0.75 µm, respectively. Thus, the second columnar structure bodies 102 have a height such that they will not be touched, given the amount of deformation of the first columnar structure bodies 101 and the amount of flexure of the glass substrates to be caused by any external pressure which is associated with the atmospheric pressure in the injection technique or the one drop filling technique. Moreover, the range of elastic deformation of the first columnar structure bodies 101 is in the range from about 0.2 µm to about 0.3 µm. Note that the range (limit) of elastic deformation can be measured with a micro hardness tester manufactured by Shimadzu Corporation), for example. It can be determined as a minimum amount of compressive strain at which "buckling" occurs when an increasing compressive load is applied to a columnar structure body.

Figure 11:
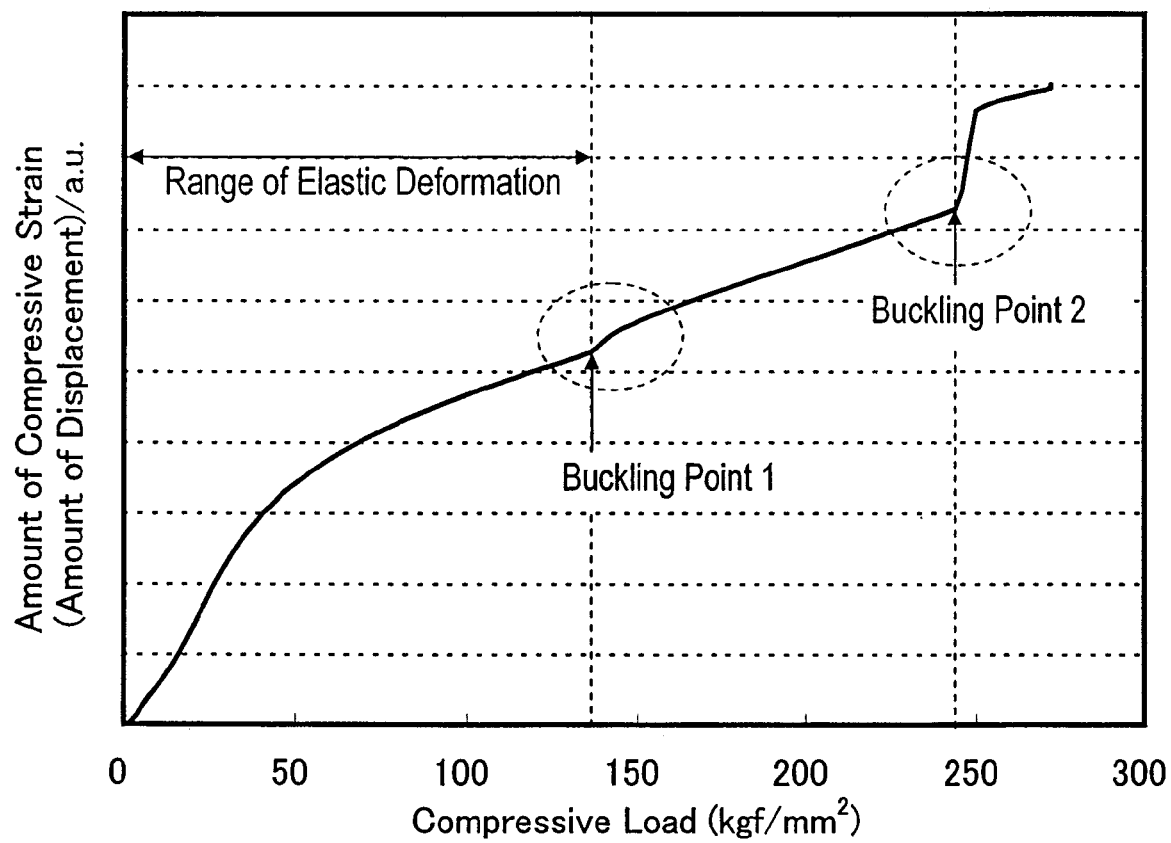
FIG. 11 is a graph for explaining a range of elastic deformation of columnar structure bodies, showing a relationship between a compressive load and an amount of compressive strain.

For example, a graph is given in FIG. 11 which shows a relationship between a compressive load and an amount of compressive strain as measured with a micro hardness tester, with respect to a (single) columnar structure body having a multilayer structure including resin colored layers and a photosensitive resin layer. In FIG. 11, there are two points (which will be referred to as "buckling points") at which the rate of change (i.e., gradient of the curve) of the amount of compressive strain makes a discontinuous change against the compressive load. Under a SEM observation, it was found that at the point associated with the smaller amount of compressive strain (buckling point 1), a phenomenon occurs where the underlying colored layers are destroyed and the overlaying photosensitive resin layer digs into the colored layers, and that at the point associated with the smaller amount of compressive strain (buckling point 1), destruction of the overlaying photosensitive resin layer occurs. The range of elastic deformation of the columnar structure body exemplified herein is the amount of compressive strain at the point associated with the smaller amount of compressive strain (buckling point 1). Note that, in the case where a columnar structure body is formed on a BM film which is composed of a resin, buckling (destruction) of the BM film may occur before buckling of the columnar structure body itself occurs. In such a case, the range of elastic deformation of a multilayer structure including the BM film and the columnar structure body may be used as the range of elastic deformation of the columnar structure body.

Next, with reference to FIG. 6 to FIG. 9, constructions for the frame region of the liquid crystal display panel 100 shown in FIG. 1 will be described. Each of FIG. 6 to FIG. 9 is a schematic cross-sectional view taken along line B-B' in FIG. 1, and shows a variation of the construction of the second columnar structure bodies 102b, where the planar arrangement is as shown in FIG. 1. The construction within the corresponding display region in FIG. 6 to FIG. 9 correspond to FIG. 2 to FIG. 5, respectively, and each second columnar structure body 102b has the same cross-sectional structure as that of each corresponding second columnar structure body 102a. However, each second columnar structure body 102b is preferably larger (in terms of its size as seen in the substrate normal direction) than each second columnar structure body 102a formed in the display region. Within the display region, the second columnar structure bodies 102a are to be provided in the pixel outskirts, and therefore their size is constrained, and the production process may be complicated. Outside the display region, however, there are no such constraints and hence a sufficient size can be adopted. For example, even in the case where the second columnar structure bodies 102a in the display region are 15 μmφ, the second columnar structure bodies 102b outside the display region may be 30 μmφ or larger.

As has already been mentioned above, the stretchability of the liquid crystal material can be improved by also providing the second columnar structure bodies 102b in the frame region.

A second columnar structure body 102b is disposed in a position substantially bisecting the shortest distance between a first columnar structure body 101 or a second columnar structure body 102a which is disposed at the outermost end of the display region and the sealing section, because the cell gap becomes narrowest at this position. If a sufficient effect is not obtained by disposing the second columnar structure body 102b at this position, two more second columnar structure bodies 102b may be disposed at: a position substantially bisecting the shortest distance between the disposed second columnar structure body 102b and the sealing section; and a position substantially bisecting the shortest distance between the disposed second columnar structure body 102b and the first columnar structure body 101 or the second columnar structure body 102a which is disposed at the outermost end of the display region. If this is not even sufficient, four more second columnar structure bodies 102b may be disposed at the respective substantially-bisecting positions.

For example, in the case where the sealing section 105 has a width of 1.6 mm; each seal spacer 106 has a diameter of 5.4 μm; and the frame portion has a width of 3.39 mm, a second columnar structure body 102b is disposed at a point where the cell gap becomes narrowest due to flexure of the glass substrates, between the sealing section 105 and the display region. Specifically, a point at which the cell gap becomes narrowest is a point at which the glass substrates have a maximum flexure, and is a center point between a portion which is supported by a seal spacer 106 and a portion which is supported by a first columnar structure body 101 in the display region. Then, second columnar structure bodies 102 are disposed at a center point between the second columnar structure body 102 having disposed and the portion which is supported by the seal spacer, and at a center point between the second columnar structure body 102 having disposed and the portion which is supported by the first columnar structure body 101 in the display region. This interval of placement is along a direction perpendicular to the sealant. Along the direction which is parallel to the sealant, placement may be performed with the same pitch as the interval of placement along the perpendicular direction (see FIG. 1).

Note that, in the frame region, it is preferable not to dispose any first columnar structure bodies 101 defining the cell gap.

In the frame region, the black matrix 90 underlying each columnar protrusion structure body 101 is relatively broad, and therefore film thinning (planarization) due to the flowing of any resin material (liquid, solution, or melt) applied thereon will not occur. Therefore, if columnar protrusion structure bodies 101 were formed in the frame region, the height of the columnar protrusion structure bodies 101 would be about 0.1 μm to about 0.2 μm higher than in the display region, where film thinning occurs due to the influence of the underlying films. If the cell gap in the frame region becomes large relative to the cell gap within the display region, the display quality will be degraded. Especially in the vertical alignment (VA) method, an increased cell gap in the peripheral portion would allow more conspicuous whitening in a black displaying state and thus result in a deteriorated quality, and therefore it is desirable to design the cell gap in the panel peripheral portion so as to be lower than that in the display region. In the frame region of the above embodiments, no first columnar structure bodies 101 are provided, and only the second columnar structure bodies 102, which do not contribute to the cell gap, are disposed. As a result, deterioration in display quality due to an increased cell gap is prevented, and prolonging of the injection time under the vacuum injection technique and generation of vacuum voids under the one drop filling technique can be prevented.

Note that a vacuum void in the frame region will not be a problem to display quality in an initial state, but may mature into a defect by moving into the screen over long periods of use, and therefore must be remedied. Not applying any alignment film to the frame region may result in a reduced interface resistance, which makes the liquid crystal material stretchable. However, it is necessary to provide an alignment film in the display region with a stable film thickness, and misalignment must also be taken into consideration. Therefore, it is preferable to provide an alignment film of about 1000 μm also in the frame region.

By using the color filter substrate and the active matrix substrate described above, a liquid crystal display panel may be produced as follows, for example.

In the case of the one drop filling technique, an active matrix substrate and a color filter substrate are subjected to a baking at 210° C. for 60 minutes as a degassing treatment before application of an alignment film, and thereafter a substrate cleaning is performed. An alignment film is applied to a film thickness of 0.06 μm, for example. After the alignment film application, a baking at 200° C. for 40 minutes is performed as an alignment film baking. Next, a post-alignment film application cleaning is performed, and thereafter a baking at 200° C. for 50 minutes is further performed as a degassing treatment. Through performing this degassing treatment in this step, voids generation due to adsorbed moisture and the like is prevented.

Next, in the case of the TN method, a rubbing treatment is performed, under the following conditions: a bristle contact length of 0.6 mm, a roller revolution of 600 rpm, and a stage speed of 60 mm/seconds. Then, a UV-curing type seal resin is applied in the periphery on the active matrix substrate, and after applying an upper-lower conductor containing electrically conductive beads to the color filter substrate, liquid crystal dropping is performed by the one drop filling technique.

As a liquid crystal display panel, using a 22" WVGA (Wide Video Graphics Allay) type, an optimum amount of liquid crystal is dropped by the liquid crystal dropping technique so that the liquid crystal will create a cell gap of 3.7 μm. Specifically, one drop is prescribed at 1.65 mg, and a regular dropping is performed inside the seal, so as to result in a total number of dropped points of 276 points and a total dropped amount of liquid crystal of 455 mg. Furthermore, the color filter substrate and the active matrix substrate, for which seal drawing and liquid crystal dropping have been performed as described above, are attached together, and the pressure of the atmosphere within the device is reduced to 1 Pa. After the substrates are attached together under this reduced pressure, the atmosphere is allowed to reach the atmospheric pressure, whereby the sealing portion is crushed and a desired gap at the sealing section is obtained.

Next, the structure which has acquired a desired cell gap at the sealing portion is subjected to a UV irradiation in a UV curing apparatus, thus performing a preliminary cure of the seal resin. The UV curing condition is 2000 mJ/cm$^2$. Furthermore, for final curing of the seal resin, a baking is performed at 130° C. for 70 minutes. At this point, the liquid crystal permeates the inside of the seal resin, such that the liquid crystal is filled within the cell. By cutting the structure into unit liquid crystal display panels after completion of baking, each liquid crystal display panel is accomplished.

In the case of the injection technique, the active matrix substrate and the color filter substrate which have been formed as described above are subjected to a substrate cleaning, and an alignment film is applied to a film thickness of 0.06 μm. After the alignment film application, a baking at 200° C. for 40 minutes is performed as an alignment film baking, and a post-alignment film application cleaning is performed. Then, a thermosetting-type seal resin is applied in the periphery on the color filter substrate, and a prebaking at 90° C. for 800 seconds is performed. An electrically conductive paste containing a carbon paste is applied to the active matrix substrate, and after the substrates are attached together, gap establishment at the sealing section is performed through a heat pressing at 120° C. for 240 seconds, and a preliminary cure of the seal is performed through a heat pressing at 160° C. for 240 seconds. The pressure is 0.16N·m. At this point, a desired gap at the sealing section is obtained. Thereafter, for final curing of the seal resin, a baking is performed at 160° C. for 60 minutes. Next, after completion of baking, the structure is cut into unit liquid crystal display panels. After the cutting, a degassing treatment is performed at 60° C., 1 Pa for 2 hours.

The panel for which the degassing treatment has been finished is then evacuated to 1 Pa within a vacuum chamber, and after being left for 240 minutes, is allowed to come in contact with a liquid crystal material. After the contact, $N_2$ gas is gradually allowed to leak into the vacuum chamber, and the pressure within the vacuum chamber is returned to the atmospheric pressure. After being left for 10 hours, the panel will have been filled with a desired amount of liquid crystal. For the panel filled with the desired amount of liquid crystal, a UV-curing end-seal resin is applied over the injection hole; about 500 μm of the resin is allowed to pervade into the panel; and thereafter a UV irradiation at 5000 mJ/cm$^2$ is performed to effect curing. Thus, the liquid crystal display panel is accomplished.

By connecting driving circuitry and the like to this liquid crystal display panel as necessary, a liquid crystal display device can be obtained.

In the liquid crystal display device thus formed, the liquid crystal material which has been dropped therein is sufficiently permeating the inside of the cell. No residual voids occur, and no deterioration in display quality due to abnormal orientation is observed. Thus, a good display quality can be obtained.

By using the above color filter substrate, where each second columnar structure body 102 not contributing to the creation of the cell gap is disposed at a position where the cell gap becomes narrowest with respect to a first columnar structure bodies 101 defining the cell gap, it is ensured that the second columnar structure bodies 102 reduce the interface resistance of the alignment films at the time of liquid crystal injection, and thus a decrease in processibility due to a prolonged injection time in the injection technique and generation of vacuum voids due to insufficient stretching of the liquid crystal material in the one drop filling technique can be suppressed.

According to the present invention, a decrease in processibility can be prevented by suppressing prolongation of the injection time for a liquid crystal display device which is produced by the injection technique, and generation of vacuum voids due to insufficient stretching of liquid crystal in the one drop filling technique can be suppressed, whereby a liquid crystal display device with good display quality can be obtained.

The invention claimed is:

1. A color filter substrate for use in a liquid crystal display panel, comprising:
   a transparent substrate;
   at least three colors of colored layers provided on the transparent substrate;
   first columnar structure bodies provided in pixel outskirts within a display region, the first columnar structure bodies defining a cell gap; and
   second columnar structure bodies provided in the pixel outskirts within the display region or outside the display region, the second columnar structure bodies having a smaller height than that of the first columnar structure bodies, such that a difference between the height of the first columnar structure bodies and the height of the second columnar structure bodies exceeds a maximum compressive distance of the first columnar structure bodies at which a minimum amount of compressive strain causes buckling as an increasing compressive load is applied to the first columnar structure bodies.

2. The color filter substrate of claim 1, having a black matrix in the pixel outskirts within the display region and/or in a frame region outside the display region, wherein the first and second columnar structure bodies are formed on the black matrix.

3. The color filter substrate of claim 1, wherein the height difference between the first columnar structure bodies and the second columnar structure bodies is 0.4 μm or more.

4. The color filter substrate of claim 1, wherein the first columnar structure bodies include a plurality of resin layers, and the second columnar structure bodies lack at least one resin layer among the plurality of resin layers of the first columnar structure bodies.

5. The color filter substrate of claim 1, wherein the first columnar structure bodies include a plurality of resin layers, and the first columnar structure bodies and the second columnar structure bodies have a common resin layer, the common resin layer having a same thickness.

6. The color filter substrate of claim 4, wherein the plurality of resin layers include a photosensitive resin layer.

7. The color filter substrate of claim 4, wherein the plurality of resin layers include at least two layers among the at least three colors of colored layers.

8. The color filter substrate of claim 1, further having, in pixel regions, protrusion structure bodies for alignment control.

9. The color filter substrate of claim 8, wherein the protrusion structure bodies for alignment control share a common layer with the second columnar structure bodies.

10. The color filter substrate of claim 1, wherein, in the display region, the second columnar structure bodies include a second columnar structure body which is disposed at a position substantially bisecting a distance between two adjacent first columnar structure bodies along a row direction or a column direction.

11. A color filter substrate for use in a liquid crystal display panel, comprising:

a transparent substrate;

at least three colors of colored layers provided on the transparent substrate;

first columnar structure bodies provided in pixel outskirts within a display region, the first columnar structure bodies defining a cell gap;

second columnar structure bodies provided in the pixel outskirts within the display region or outside the display region, the second columnar structure bodies having a smaller height than that of the first columnar structure bodies, such that a difference from the height of the first columnar structure bodies exceeds a range of elastic deformation of the first columnar structure bodies; and a sealing section outside the display region, the second columnar structure bodies including a second columnar structure body which is disposed at a position substantially bisecting a shortest distance between a first columnar structure body or second columnar structure body which is disposed at an outermost end of the display region and the sealing section.

12. The color filter substrate of claim 1, further comprising a vertical alignment film.

13. A liquid crystal display panel comprising the color filter substrate of claim 1.

14. A liquid crystal television set comprising the liquid crystal display panel of claim 13.

* * * * *